United States Patent
Inoue et al.

(10) Patent No.: US 8,042,881 B2
(45) Date of Patent: Oct. 25, 2011

(54) BICYCLE WHEEL SECURING STRUCTURE

(75) Inventors: Jun Inoue, Osaka (JP); Takanori Kanehisa, Osaka (JP)

(73) Assignee: Shimano Inc., Osaka (JP)

( * ) Notice: Subject to any disclaimer, the term of this patent is extended or adjusted under 35 U.S.C. 154(b) by 315 days.

(21) Appl. No.: 12/268,469

(22) Filed: Nov. 11, 2008

(65) Prior Publication Data
US 2009/0072613 A1    Mar. 19, 2009

(51) Int. Cl.
*B60B 27/00* (2006.01)
(52) U.S. Cl. ...................... 301/124.2; 280/279
(58) Field of Classification Search ............... 301/124.2, 301/110.5; 280/279
See application file for complete search history.

(56) References Cited

U.S. PATENT DOCUMENTS

| | | | |
|---|---|---|---|
| 5,549,315 A * | 8/1996 | Ashman | 280/279 |
| 5,673,925 A * | 10/1997 | Stewart | 280/279 |
| 6,089,675 A * | 7/2000 | Schlanger | 301/124.2 |
| 7,654,546 B2 * | 2/2010 | Watarai | 280/279 |
| 7,654,548 B2 * | 2/2010 | Kanehisa et al. | 280/279 |
| 7,669,871 B2 * | 3/2010 | Watarai | 280/279 |
| 2008/0197602 A1 | 8/2008 | Watarai | |
| 2009/0115241 A1 * | 5/2009 | Kanehisa | 301/124.2 |
| 2009/0315295 A1 * | 12/2009 | Laird et al. | 280/279 |

FOREIGN PATENT DOCUMENTS

FR    893959 A    12/1944

* cited by examiner

*Primary Examiner* — Jason Bellinger
(74) *Attorney, Agent, or Firm* — Global IP Counselors, LLP

(57) ABSTRACT

A bicycle wheel securing structure includes a bicycle fork, an adapter and a holding member. The bicycle fork has two axle support portions that are spaced apart for receiving a bicycle hub therebetween. The adapter is disposed in an adapter receiving bore in one of the axle support portions. The adapter includes a threaded axle mounting opening. The holding member is operatively coupled between the adapter and the one of the axle support portions with the adapter. The holding member prevents both rotational movement of the adapter with respect to the bicycle fork and axial movement of the adapter with respect to the bicycle fork along an axis of the axle mounting opening when the holding member is in a retaining position. The adapter is rotatable within the adapter receiving bore without moving axially with respect to the bicycle fork when the holding member is in a releasing position.

6 Claims, 7 Drawing Sheets

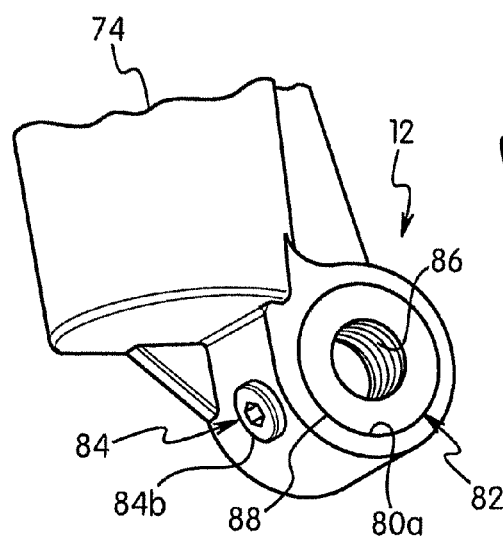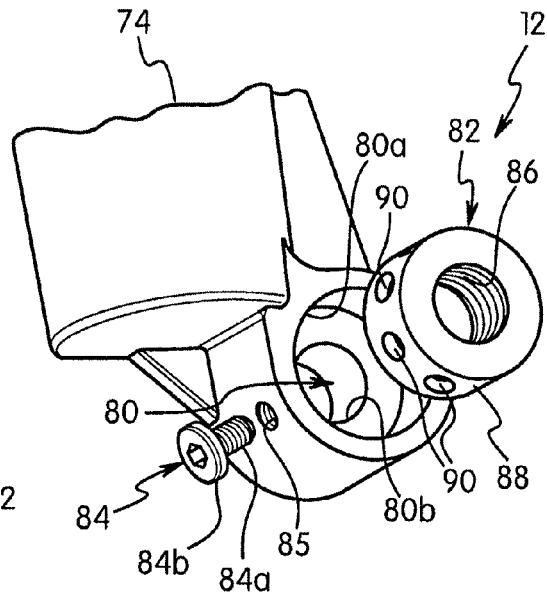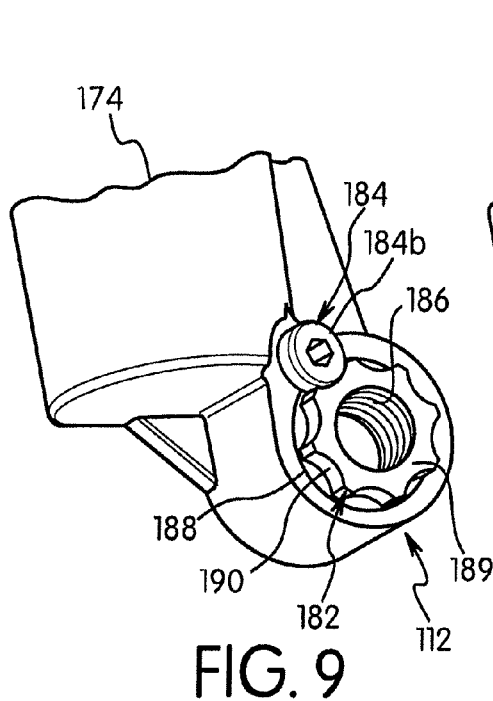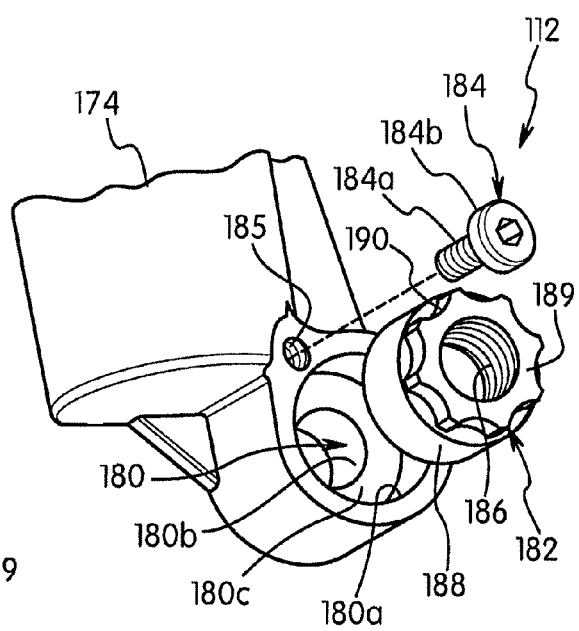

BICYCLE WHEEL SECURING STRUCTURE

CROSS-REFERENCE TO RELATED APPLICATIONS

Background of the Invention

1. Field of the Invention

This invention generally relates to a connection between a bicycle fork and a wheel securing axle of a bicycle hub. More specifically, the present invention relates to a bicycle wheel securing structure used to attach the wheel securing axle of the bicycle hub to the bicycle fork.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

A bicycle is generally provided with a frame and a front fork that is pivotally connected to a front end portion of the frame. The front fork basically includes a fork stem, a fork crown and a pair of fork legs. The two fork legs are arranged on opposite sides of the front wheel with the tip end portions of the fork legs being connected to a front hub arranged on the rotational center of the front wheel. The fork crown is connected to the upper end portions (i.e., opposite ends from the tip end portions) of the fork legs. The fork stem is connected to the fork crown, and is arranged to extend upwardly form the fork crown. The fork stem is supported on the front end portion of the frame in a freely rotatable manner. In some cases, the front fork is a suspension fork with each of the fork legs including an upper or inner tube and a lower or outer tube that is telescopically arranged with the upper tube. The rear part of the frame has a similar rear fork that is not pivotal like the front fork. The rear fork can be fixed to the frame (i.e. a hard tail type) to form the rear triangle of the frame or can be a suspension type rear fork attached to the frame.

Typically, the lower tip ends of the forks are provided with dropouts (open ended slots) for attaching the wheels. In the past, the ends of the hub axles were inserted into the dropouts (open ended slots) and then fastened with nuts. However, since bicycle wheels often need to be removed from the frame, e.g., whenever there is a flat tire or a need to transport the bicycle in an automobile, wheel securing mechanisms were developed in order to facilitate easier removal and reinstallation of the wheels. A typical wheel securing device includes a skewer with a threaded end having a wheel securing member mounted at the other end. The wheel securing member includes a base with a lever and a cam structure. A nut is detachably threaded onto the threaded end of the skewer after the skewer is inserted through the hub body. The fork flanges are arranged between the base of the wheel securing member and the hub body and between the nut and the hub body, respectively. Thus, the hub can be attached by clamping the fork flanges using the wheel securing lever.

While these typical wheel securing mechanisms generally work well, a tighter connection between the hub and the frame has been in demand for some riders. Thus, bicycle hubs and bicycle forks have been designed such that an axle of the hub is threadedly attached directly to the bicycle fork. An example of this type of arrangement on a front hub and front fork is disclosed in U.S. Pat. No. 6,089,675. With this type of arrangement, a knob is provided on the end of the hub axle opposite the threaded end. The knob is used to rotate the axle during installation to both tighten the axle to the front fork and to clamp one fork flange between the knob and the hub. With this type of hub, a tighter connection between the hub and the front fork is possible as compared to typical wheel securing hubs. However, because of this tighter connection, it is necessary to make the front fork stronger.

In view of the above conventional technology, it will be apparent to those skilled in the art from this disclosure that there exists a need for an improved connection between a fork and a wheel securing axle of a hub. This invention addresses this need in the art as well as other needs, which will become apparent to those skilled in the art from this disclosure.

SUMMARY OF THE INVENTION

One object of the present invention is to provide a bicycle wheel securing structure, which utilizes a removable adapter that is prevented from moving axially with respect to a bicycle fork once attached thereto.

Another object of the present invention is to provide a bicycle wheel securing structure, which can provide a strong connection between a bicycle fork and a wheel securing axle of a bicycle hub.

The foregoing objects can basically be attained by providing a bicycle wheel securing structure, which comprises a bicycle fork, an adapter and a holding member. The bicycle fork has a pair of axle support portions that are spaced apart to receive a bicycle hub therebetween and with one of the axle support portions having an adapter receiving bore. The adapter is disposed in the adapter receiving bore in one of the axle support portions. The adapter includes a threaded axle mounting opening and an outer circumferential surface that is rotatably adjustable within the adapter receiving bore to one of a plurality of predetermined orientations. The holding member is operatively coupled between the adapter and the one of the axle support portions with the adapter. The holding member is selectively movable between a retaining position and a releasing position. The holding member prevents both rotational movement of the adapter with respect to the bicycle fork and axial movement of the adapter with respect to the bicycle fork along an axis of the axle mounting opening when the holding member is in the retaining position. The adapter is rotatable within the adapter receiving bore without moving axially with respect to the bicycle fork when the holding member is in the releasing position.

These and other objects, features, aspects and advantages of the present invention will become apparent to those skilled in art from the following detailed description, which, taken in conjunction with the annexed drawings, discloses preferred embodiment of the present invention.

BRIEF DESCRIPTION OF THE DRAWINGS

Referring now to the attached drawings which form a part of this original disclosure:

FIG. 7 is a perspective view of one end of the wheel securing structure illustrated in FIGS. 2 to 6;

FIG. 8 is an exploded perspective view of the end of the wheel securing structure illustrated in FIG. 7;

FIG. 9 is a perspective view of one end of the wheel securing structure in accordance with a second embodiment;

FIG. 10 is an exploded perspective view of the end of the wheel securing structure, illustrated in FIG. 9, in accordance with the second embodiment;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
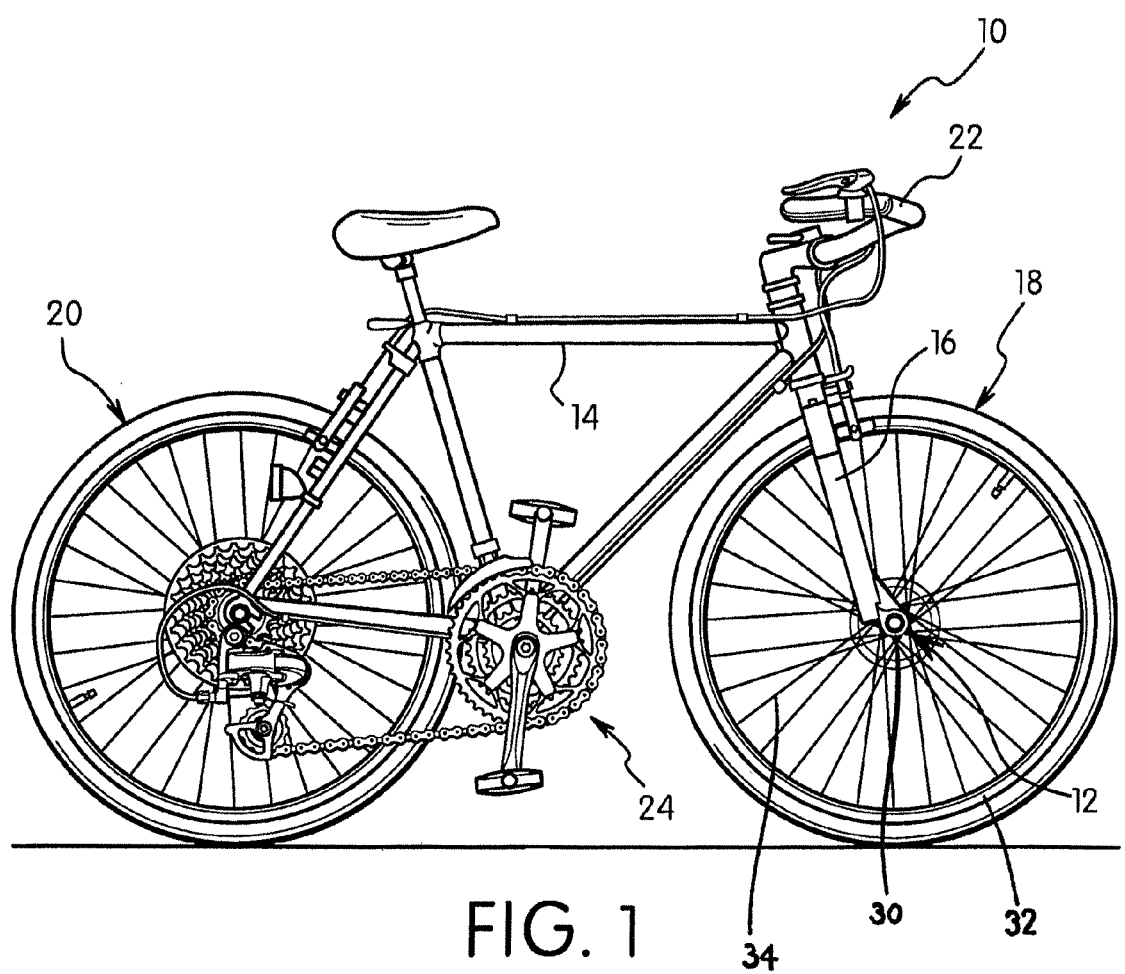
FIG. 1 is a side elevational view of a bicycle using a bicycle wheel securing structure in accordance with a first embodiment.
Figure 2:
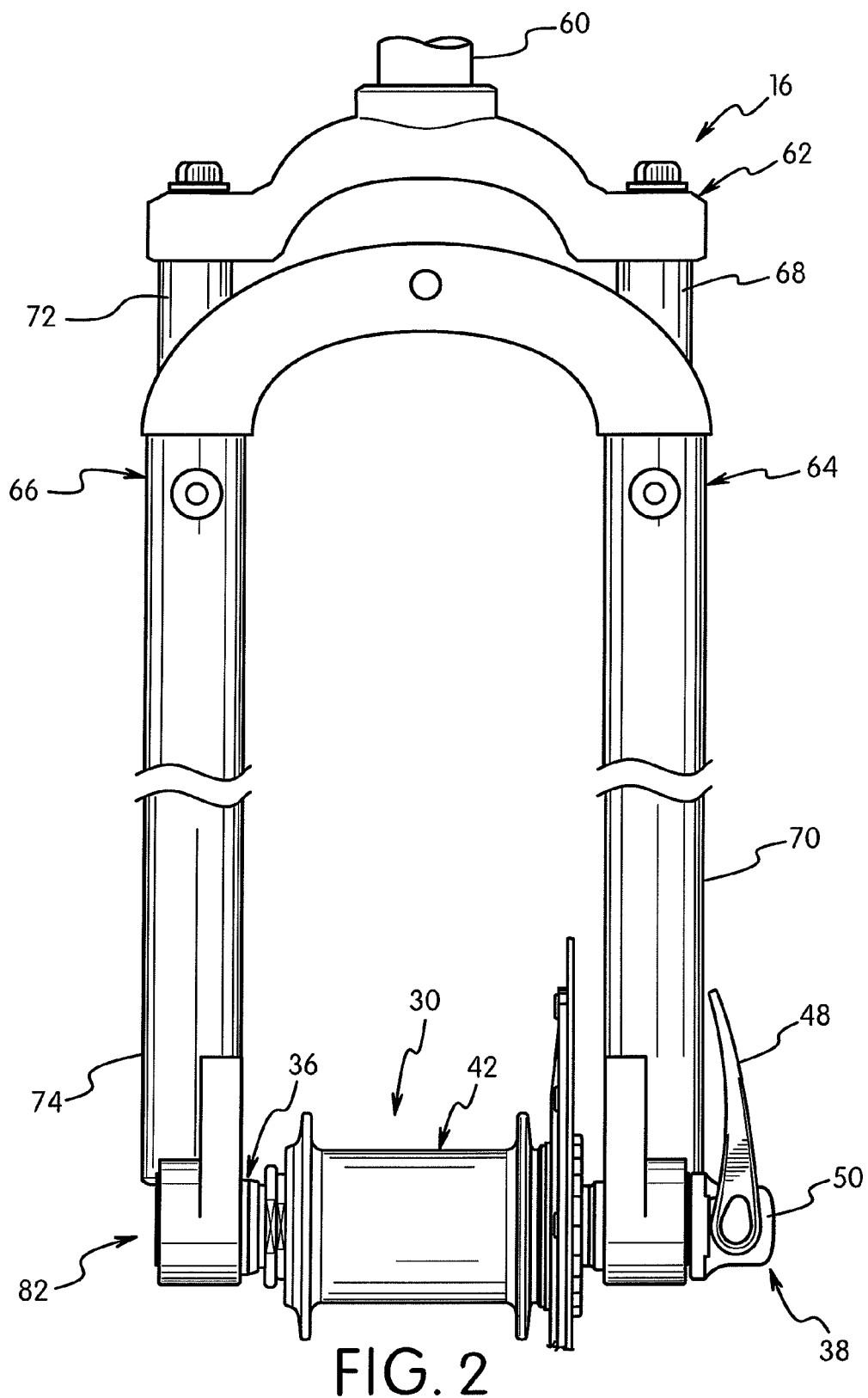
FIG. 2 is an enlarged, partial front elevational view of the wheel securing structure illustrated in FIG. 1.
Figure 3:
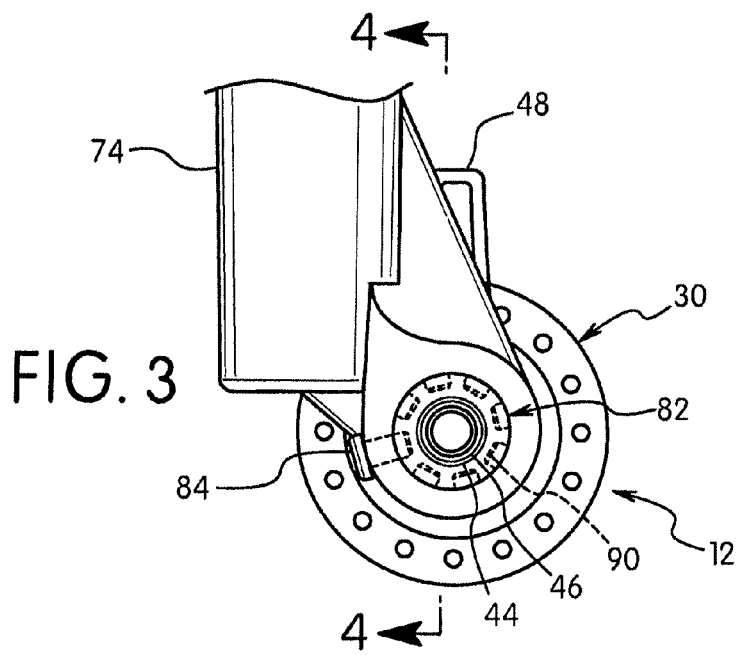
FIG. 3 is a side elevational view of the wheel securing structure illustrated in FIG. 2.

Referring initially to FIGS. 1 and 2, a bicycle 10 is illustrated in that uses a wheel securing structure 12 in accordance with a first embodiment. The bicycle 10 basically includes, among other things, a main frame 14, a front suspension fork 16, a front wheel 18, a rear wheel 20, a handlebar 22 and a drive train 24. The front wheel 18 is attached the front fork 16 using the wheel securing structure 12 in accordance with the first embodiment, as explained below. Otherwise, the bicycle 10 and its various components are conventional. Moreover, it will be apparent to those skilled in the bicycle art from this disclosure that various modifications can be made to the bicycle 10 and its components without departing from the present invention. For example, the rear triangle portion of the main frame 14 can be connected to the rear wheel 20 in the same manner as the connection between the front fork 16 and the front wheel 18. Also the wheel securing structure 12 can be applied to a non-suspension front fork and/or to a rear suspension type bicycle frame.

Referring still to FIG. 1, the front wheel 18 basically includes a front hub 30, a rim 32 and a plurality of tension spokes 34 extending between the front hub 30 and the rim 32. A tire is mounted on the rim 32 in a conventional manner. The structure of the front wheel 18 is not critical to the present invention, and thus, will not be discussed and/or illustrated in detail herein, except as necessary to understand the present invention. Specifically, only the front hub 30 will be briefly discussed to understand the connection of the front hub 30 to the front fork 16.

Figure 4:
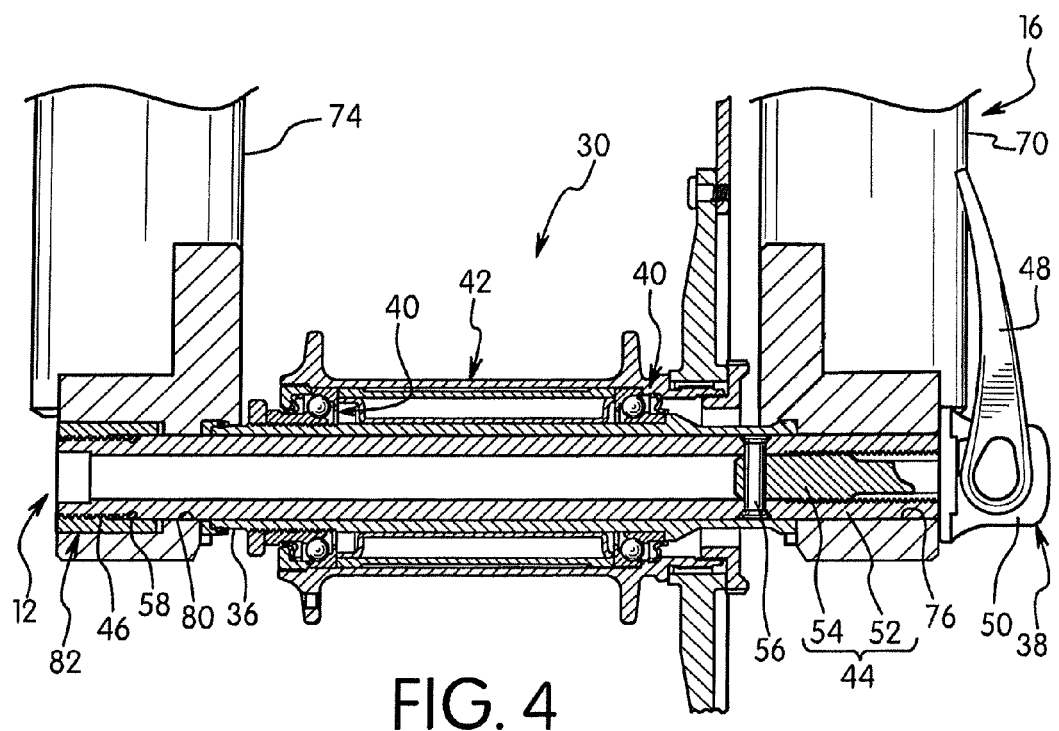
FIG. 4 is a slightly enlarged, partial longitudinal cross sectional view of the front hub and the wheel securing structure illustrated in FIGS. 2 and 3, as seen along section line 4-4 of FIG. 3.
Figure 5:
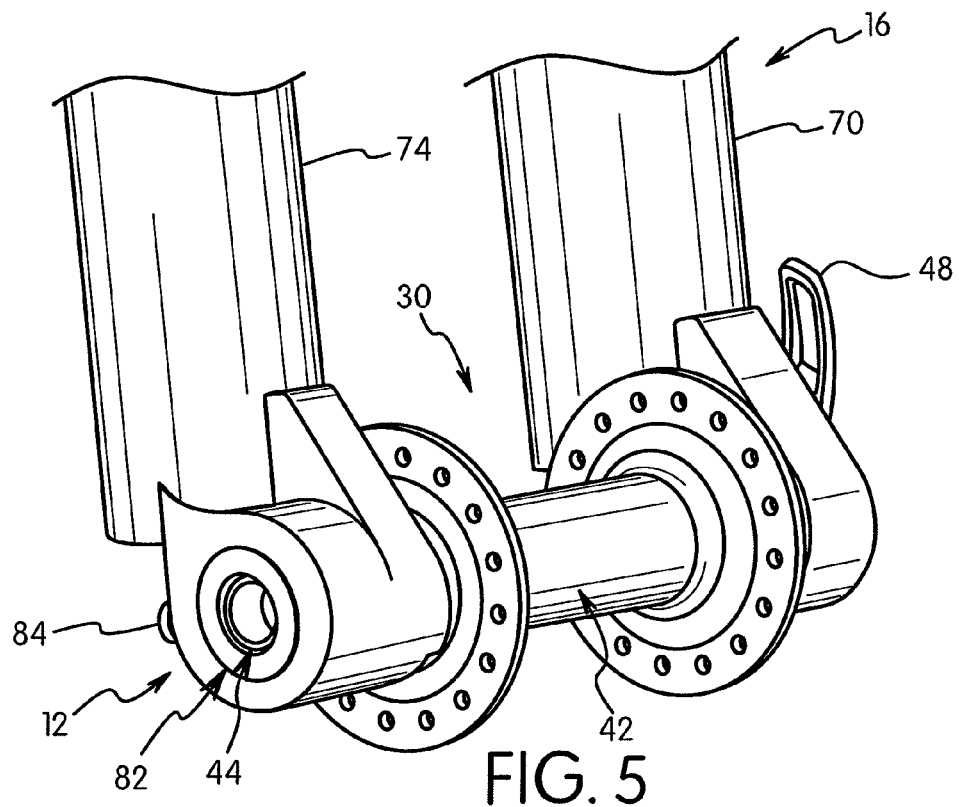
FIG. 5 is an enlarged front perspective view of the front hub and the wheel securing structure illustrated in FIGS. 2 to 4.
Figure 6:
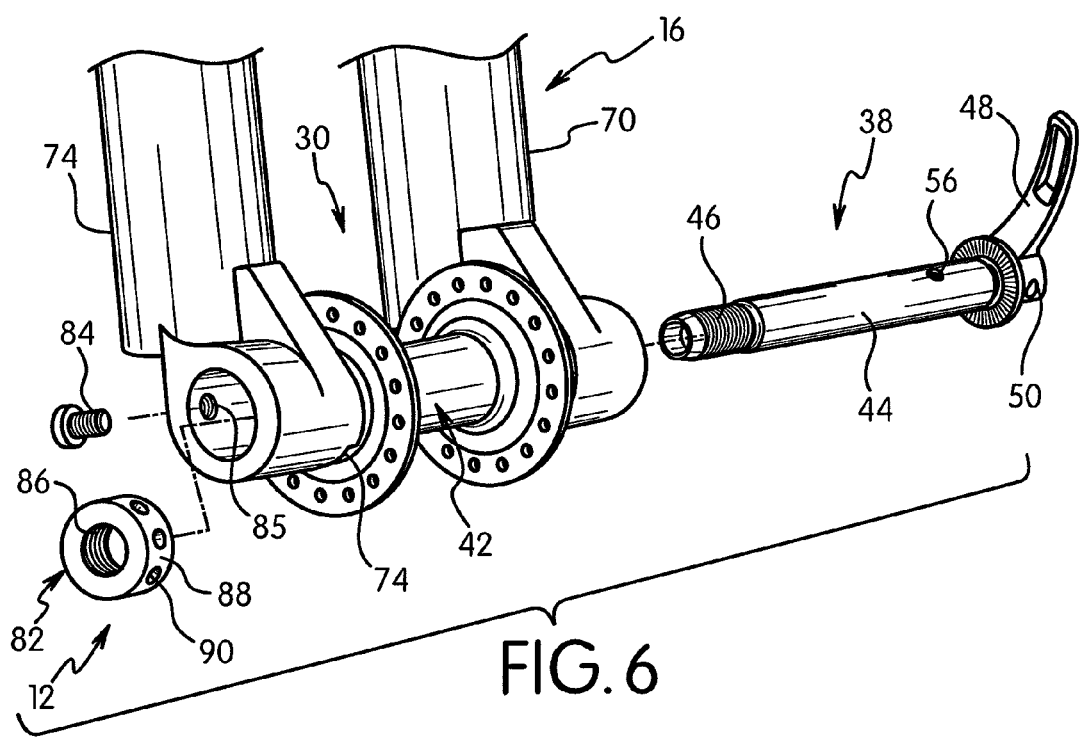
FIG. 6 is a partially exploded front perspective view of the wheel securing structure illustrated in FIGS. 2 to 5.

Referring now to FIG. 4, the front hub 30 basically includes a tubular hub axle 36, a wheel securing axle 38, a pair of bearing units 40 and a hub shell 42. The hub shell 42 is rotatably supported on the tubular hub axle 36 via the bearing units 40. The wheel securing axle 38 extends through the tubular hub axle 36 and fixes the tubular hub axle 36 to the front fork 16 so that the hub shell 42 can rotate about the tubular hub axle 36 on the bearing units 40. In particular, the wheel securing axle 38 has a shaft or skewer 44 that extends through the tubular hub axle 36. One end of the skewer 44 has an external thread 46, while the other end of the skewer 44 has a cam lever 48 pivotally mounted thereto by a steel cam (not shown) and a cam cap 50 that surrounds the cam of the cam lever 48. The cam cap 50 is the part of the wheel securing axle 38 that moves axially back and forth relative to the skewer 44 when the cam lever 48 is moved between a release or open position (not shown) and a clamping or closed position in a conventional manner. In the illustrated embodiment, the skewer 44 is a two-part member having an outer shaft 52 and an inner shaft 54 threadedly attached within an internal bore of the outer shaft 52. In this embodiment, the cam lever 48 and the cam cap 50 are attached to a free end of the inner shaft 54 that extends out of the internal bore of the outer shaft 52. A retaining member 56 such as a rivet, a press pin (shown) or a bolt (not shown) extends transversely through holes formed in the outer and inner shafts 52 and 54 to prevent rotational movement of the inner shaft 54 relative to the outer shaft 52 when the retaining member 56 is disposed in the transverse holes, as best understood from FIG. 4. Since the outer and inner shafts 52 and 54 are threadedly coupled together, axial movement of the inner shaft 54 relative to the outer shaft 52 is prevented when relative rotation is prevented. Of course, it will be apparent to those skilled in the bicycle art from this disclosure that the skewer 44 illustrated herein is merely one example of many possible structures that could be utilized as needed and/or desired. The outer shaft 52 preferably has an O-ring 58 mounted in an annular groove adjacent the external thread 46.

Referring again to FIGS. 1-4, the front fork 16 is rotatably mounted to a head tube in a front part of the main frame 14, and is used to steer the front wheel 18. As seen in FIG. 2, the front fork 16 basically includes a fork stem or steerer tube 60, a fork crown 62 and a pair of fork legs 64 and 66. The fork legs 64 and 66 are arranged on opposite sides of the front wheel 18 with the tip end portions of the fork legs 64 and 66 being connected to the front hub 30 that is arranged on the rotational center of the front wheel 18. In the illustrated embodiment, the front fork 16 is a suspension fork in which the fork leg 64 includes an upper or inner tube 68 and a lower or outer tube 70 that is telescopically arranged with the upper tube 68, while the fork leg 66 includes an upper or inner tube 72 and a lower or outer tube 74 that is telescopically arranged with the upper tube 72. The fork crown 62 is connected to the upper ends of the upper tubes 68 and 72 (i.e., opposite ends from the tip end of the lower tubes 70 and 74) of the fork legs 64 and 66. The fork stem 60 is connected to the fork crown 62, and is arranged to extend upwardly form the fork crown 62. The fork stem 60 is supported on the front end portion of the main frame 14 in a freely rotatable manner. The lower tip end portions of the fork legs 64 and 66 constitute a pair of axle support portions that are spaced apart to receive the front hub 30.

Referring now to FIGS. 5 to 8, the lower end of the outer tube 70 of the (first) fork leg 64 includes a first axle mounting opening or bore 76 receives the skewer 44 therethrough. Specifically, the axle mounting bore 76 is sized to slidably receive the outer shaft 52. The lower end of the outer tube 74 of the (second) fork leg 66 includes a second axle mounting opening or bore 80 for securing the skewer 44 thereto. The axle mounting bore 80 has a step-shaped configuration with an enlarged section 80a and a reduced section 80b, each of which are unthreaded. The enlarged section 80a of the outer tube 74 (e.g., the axle support portion) constitutes an adapter receiving bore of the bicycle fork 16.

As seen in FIGS. 7 and 8, a wheel securing adapter 82 is secured in the enlarged section 80a of the axle mounting bore 80 by a threaded fastener 84 in a releasable and reinstallable manner. The threaded fastener 84 constitutes a holding member that prevents both rotational movement of the wheel securing adapter 82 with respect to the bicycle fork 16 and axial movement of the wheel securing adapter 82 with respect to the bicycle fork 16 along an axis of the axle mounting bore 80 when the threaded fastener 84 (e.g., the holding member) is in a retaining position. The threaded fastener 84 (e.g., the holding member) is selectively movable between the retaining position and a releasing position by threading the threaded fastener 84 into or out of a threaded hole 85 in the outer tube 74 (e.g., the axle support portion). Thus, the threaded fastener 84 (e.g., the holding member) is operatively coupled between the wheel securing adapter 82 and the outer tube 74 (e.g., the axle support portion) to selectively hold the wheel securing adapter 82 in a predetermined orientations with respect to the outer tube 74 (e.g., the axle support portion).

The wheel securing adapter 82 is preferably a one-piece, unitary member that is formed of a hard rigid material. Preferably, the material of the wheel securing adapter 82 is harder than the material of the outer tube 74 of the fork leg 66. Thus, if the wheel securing adapter 82 becomes damaged, the wheel securing adapter 82 can be replaced without replacing the front fork 16, which is sometimes necessary with prior art connections. The wheel securing adapter 82 includes a threaded axle mounting opening 86 and an outer circumferential surface 88 that is rotatably adjustable within the enlarged section 80a (e.g., the adapter receiving bore) of the (second) fork leg 66.

In this embodiment, the threaded fastener 84 (e.g., the holding member) includes a bolt with a threaded shaft 84a and an enlarged head 84b. The threaded shaft 84a of the bolt constitutes an attachment portion of the holding member. The enlarged head 84b constitutes an engagement portion of the holding member. The threaded shaft 84a is removably attached to the bicycle fork by threading into the threaded hole 85 in the outer tube 74.

The outer circumferential surface 88 of the wheel securing adapter 82 includes a plurality of recesses 90 with the threaded fastener 84 (e.g., the holding member) being engagable with the recesses 90 to selectively hold the wheel securing adapter 82 in one of a plurality of predetermined orientations based on which one of the recesses 90 is engaged with the threaded fastener 84 (e.g., the holding member). The recesses 90 can be radially extending bores that extend from the outer circumferential surface 88 to the threaded axle mounting opening 86, if needed and/or desired.

Since the outer circumferential surface 88 of the wheel securing adapter 82 is cylindrical without any splines or threads along an entire axial length of the outer circumferential surface 88, the wheel securing adapter 82 is freely rotatable within the enlarged section 80a (e.g., the adapter receiving bore) of the (second) fork leg 66 without moving axially with respect to the front fork 16, when the threaded fastener 84 (e.g., the holding member) is in the releasing position. The threaded fastener 84 has a center axis that is radially arranged with respect to the axis of the threaded axle mounting opening 86.

The threaded fastener 84 (e.g., the holding member) is selectively movable between the retaining position and a releasing position by threading the threaded fastener 84 into or out of a threaded hole 85 in the outer tube 74 (e.g., the axle support portion). Thus, the threaded fastener 84 (e.g., the holding member) remains attached to the outer tube 74 (e.g., the axle support portion) in both of the retaining and releasing positions. When the threaded fastener 84 is fully installed into the threaded hole 85 in the outer tube 74 and the wheel securing adapter 82 is fully installed within the enlarged section 80a (e.g., the adapter receiving bore) of the (second) fork leg 66, the tip end of the shaft of the threaded fastener 84 engages one of the recesses 90 of the wheel securing adapter 82 to prevent relative rotational and axial movements of the wheel securing adapter 82 with respect to the (second) fork leg 66.

The wheel securing adapter 82 can be installed, removed and reinstalled without damaging the lower end of the outer tube 74 of the fork leg 66, and the wheel securing adapter 82 can be axially retained in the axle mounting bore 80 even when the wheel securing adapter 82 is not attached to the skewer 44. The reduced section 80b receives the skewer 44 therethrough, and is sized to support the skewer 44. In the illustrated embodiment, the axle mounting bore 80 has a circular shape as viewed along the center axis thereof.

The threaded axle mounting opening 86 of the wheel securing adapter 82 threadedly engages the external thread 46 of the end of the skewer 44 of the wheel securing axle 38 to secure the tubular hub axle 36 of the front hub 30 to the outer tube 74 of the fork leg 66.

Once the wheel securing adapter 82 is fully installed within the enlarged section 80a (e.g., the adapter receiving bore) of the (second) fork leg 66, the threaded fastener 84 (e.g., the holding member) is can be installed to prevent rotation of the wheel securing adapter 82. If the starting thread position of the wheel securing adapter 82 needs to be adjusted (i.e., to adjust the final position of the cam lever 48), then the threaded fastener 84 can be partially unthreaded so that the tip end of the shaft of the threaded fastener 84 is retracted from one of the recesses 90 of the wheel securing adapter 82 to allow for relative rotational movement of the wheel securing adapter 82 with respect to the (second) fork leg 66.

After the wheel securing axle 38 is rotated to the desired final rotational position, the threaded fastener 84 is threaded so that the tip end of the shaft of the threaded fastener 84 engages one of the recesses 90 of the wheel securing adapter 82 to prevent relative rotational movement of the wheel securing adapter 82 with respect to the (second) fork leg 66. If the thread starting position of the wheel securing adapter needs to be adjusted again later, the threaded fastener 84 should again be removed (or retracted) so that the wheel securing adapter 82 can be rotated. Accordingly, because the wheel securing adapter 82 is freely rotatable within the enlarged section 80a of the fork leg 66 without moving axially with respect to the front fork 16 when the threaded fastener 84 is in the releasing position, it is possible to prevent the adapter 82 from undesirably projecting from the laterally outermost surface of the lower end of the outer tube 74 when the adapter 82 is rotated for adjustment.

Second Embodiment

Referring now to FIGS. 9 and 10, a modified wheel securing structure 112 in accordance with a second embodiment will now be explained. The wheel securing structure 112 of this second embodiment basically includes a modified outer tube 174, a modified wheel securing adapter 182, and a modified threaded fastener 184. The wheel securing adapter 182 is a one-piece, unitary member that is formed of a hard rigid material. Preferably, the material of the wheel securing adapter 182 is harder than the material of the outer tube 174. The outer tube 174 is incorporated into the front fork 16 of the first embodiment by replacing the outer tube 74 of the first embodiment in the front fork 16 with the outer tube 174. Thus, the rest of the parts of the front fork 16 illustrated in the first embodiment are used with this embodiment.

The lower end of the outer tube 174 of the fork leg of the front fork 16 includes an axle mounting opening or bore 180. The axle mounting bore 180 receives the wheel securing adapter 182 for securing the skewer 44 of the hub 30 of the first embodiment thereto in the same manner as the first embodiment, but using the wheel securing adapter 182 instead of the wheel securing adapter 82. The axle mounting bore 180 has a step-shaped configuration with an enlarged section 180a and a reduced section 180b, each of which are unthreaded. The enlarged section 180a of the outer tube 174 (e.g., the axle support portion) constitutes an adapter receiving bore of the bicycle fork 16. An abutment surface 180c is formed between the sections 180a and 180b to limit axial movement of the wheel securing adapter 182 towards the other fork leg of the front fork 16.

The wheel securing adapter 182 is secured in the enlarged section 180a of the axle mounting bore 180 by the threaded fastener 184 in a releasable and reinstallable manner. The threaded fastener 184 constitutes a holding member. The threaded fastener 184 (e.g., the holding member) prevents both rotational movement of the wheel securing adapter 182 with respect to the bicycle fork 16 and axial movement of the wheel securing adapter 182 with respect to the bicycle fork 16 along an axis of the axle mounting bore 180 when the threaded fastener 184 (e.g., the holding member) is in a retaining position. The threaded fastener 184 (e.g., the holding member) is selectively movable between the retaining position and a releasing position by threading the threaded fastener 184 into or out of a threaded hole 185 in the outer tube 174 (e.g., the axle support portion). Thus, the threaded fastener 184 (e.g., the holding member) is operatively coupled between the wheel securing adapter 182 and the outer tube 174 (e.g., the axle support portion) to selectively hold the wheel securing adapter 182 in a predetermined orientations with respect to the outer tube 174 (e.g., the axle support portion).

The wheel securing adapter 182 includes a threaded axle mounting opening 186 and an outer circumferential surface 188 that is rotatably adjustable within the enlarged section 180a (e.g., the adapter receiving bore) of the outer tube 174 (e.g., the axle support portion). In this embodiment, the wheel securing adapter 182 has an axial end face with an axially projecting part 189 extending axially from the axial end face of the wheel securing adapter 182. The axially projecting part 189 has a plurality of recesses 190. The threaded fastener 184 (e.g., the holding member) engages the recesses 190 (i.e., one at a time) to selectively hold the wheel securing adapter 182 in one of a plurality of predetermined orientations based on which one of the recesses 190 is engaged with the threaded fastener 184 (e.g., the holding member).

In this embodiment, the threaded fastener 184 (e.g., the holding member) includes a bolt with a threaded shaft 184a and an enlarged head 184b. The threaded shaft 184a of the bolt constitutes an attachment portion of the holding member. The enlarged head 184b constitutes an engagement portion of the holding member. The threaded shaft 184a is removably attached to the bicycle fork by threading into the threaded hole 185 in the outer tube 174.

Since the outer circumferential surface 188 of the wheel securing adapter 182 is cylindrical without any splines or threads along an entire axial length of the outer circumferential surface 188, the wheel securing adapter 182 is freely rotatable within the enlarged section 180a (e.g., the adapter receiving bore) without moving axially with respect to the front fork 16, when the threaded fastener 184 (e.g., the holding member) is in the releasing position.

When the threaded fastener 184 is in the retaining position, the enlarged head 184b (e.g., the engagement portion) of the threaded fastener 284 (e.g., the holding member) engages the axial end face of the wheel securing adapter 182 to prevent the axial movement of the wheel securing adapter 182. Also when the threaded fastener 184 is in the retaining position, the enlarged head 184b (e.g., the engagement portion) of the threaded fastener 284 (e.g., the holding member) engages one of the circumferentially spaced recesses 190 of the axially projecting part 189 of the wheel securing adapter 182 to prevent the rotational movement of the wheel securing adapter 182. In particular, the enlarged head 184b is selectively received in the recesses 190 of the axially projecting part 189 to prevent the rotational movement of the wheel securing adapter 182.

Third Embodiment

Figure 11:
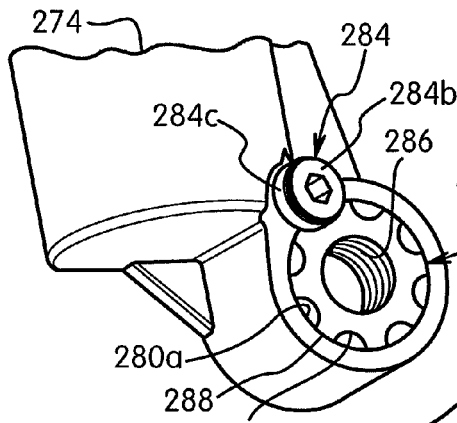
FIG. 11 is a perspective view of one end of the wheel securing structure in accordance with a third embodiment.
Figure 12:
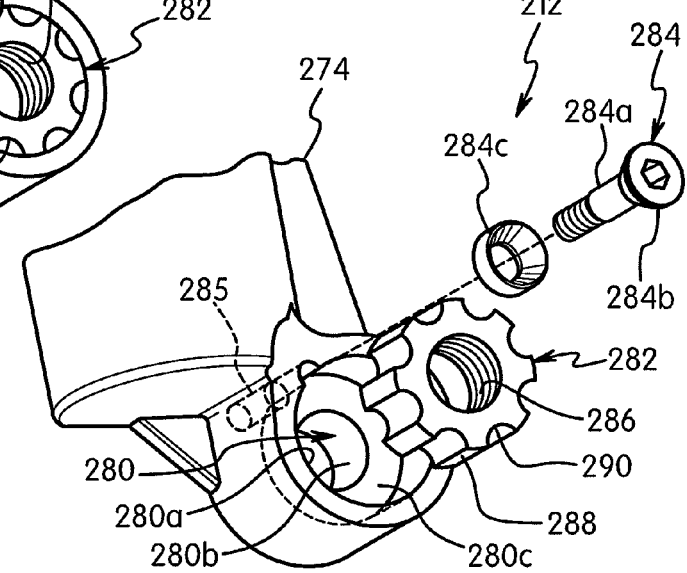
FIG. 12 is an exploded perspective view of the end of the wheel securing structure, illustrated in FIG. 11, in accordance with the third embodiment.

Referring now to FIGS. 11 and 12, a modified wheel securing structure 212 in accordance with a third embodiment will now be explained. The wheel securing structure 212 of this third embodiment basically includes a modified outer tube 274, a modified wheel securing adapter 282, and a modified threaded fastener 284. The wheel securing adapter 282 is a one-piece, unitary member that is formed of a hard rigid material. Preferably, the material of the wheel securing adapter 282 is harder than the material of the outer tube 274. The outer tube 274 is incorporated into the front fork 16 of the first embodiment by replacing the outer tube 74 of the first embodiment in the front fork 16 with the outer tube 274. Thus, the rest of the parts of the front fork 16 illustrated in the first embodiment are used with this embodiment.

The lower end of the outer tube 274 of the fork leg of the front fork 16 includes an axle mounting opening or bore 280. The axle mounting bore 280 receives the wheel securing adapter 282 for securing the skewer 44 of the hub 30 of the first embodiment thereto in the same manner as the first embodiment, but using the wheel securing adapter 282 instead of the wheel securing adapter 82. The axle mounting bore 280 has a step-shaped configuration with an enlarged section 280a and a reduced section 280b, each of which are unthreaded. The enlarged section 280a of the outer tube 274 (e.g., the axle support portion) constitutes an adapter receiving bore of the bicycle fork 16. An abutment surface 280c is formed between the sections 280a and 280b to limit axial movement of the wheel securing adapter 282 towards the other fork leg of the front fork 16.

The wheel securing adapter 282 is secured in the enlarged section 280a of the axle mounting bore 280 by the threaded fastener 284 in a releasable and reinstallable manner. The threaded fastener 284 constitutes a holding member. The threaded fastener 284 (e.g., the holding member) prevents both rotational movement of the wheel securing adapter 282 with respect to the bicycle fork 16 and axial movement of the wheel securing adapter 282 with respect to the bicycle fork 16 along an axis of the axle mounting bore 280 when the threaded fastener 284 (e.g., the holding member) is in a retaining position. The threaded fastener 284 (e.g., the holding member) is selectively movable between the retaining position and a releasing position by threading the threaded fastener 284 into or out of a threaded hole 285 in the outer tube 274 (e.g., the axle support portion). Thus, the threaded fastener 284 (e.g., the holding member) is operatively coupled between the wheel securing adapter 282 and the outer tube 274 (e.g., the axle support portion) to selectively hold the wheel securing adapter 282 in a predetermined orientations with respect to the outer tube 274 (e.g., the axle support portion).

In this embodiment, the threaded fastener 284 (e.g., the holding member) includes a bolt with a threaded shaft 284a and an enlarged head 284b. The threaded fastener 284 (e.g., the holding member) also includes a washer 284c positioned on the threaded shaft 284a of the bolt. The threaded shaft 284a of the bolt constitutes an attachment portion of the holding member. A portion of the threaded shaft 284a and the washer 284c constitutes an engagement portion of the holding member.

The wheel securing adapter 282 includes a threaded axle mounting opening 286 and an outer circumferential surface 288 that is rotatably adjustable within the enlarged section 280a (e.g., the adapter receiving bore) of the outer tube 274 (e.g., the axle support portion). In this embodiment, the outer circumferential surface 288 of the wheel securing adapter 282 has a plurality of grooves or recesses 290. The threaded fastener 284 (e.g., the holding member) selectively engages the recesses 290 (i.e., one at a time) to selectively hold the wheel securing adapter 282 in one of a plurality of predetermined orientations based on which one of the recesses 290 is engaged with the threaded fastener 284 (e.g., the holding member). In particular, when the threaded fastener 284 is in the retaining position, the washer 284c (e.g., a part of the engagement portion) of the threaded fastener 284 (e.g., the holding member) engages the axial end face of the wheel securing adapter 282 to prevent the axial movement of the wheel securing adapter 282 and a portion of the threaded shaft 284a (e.g., a part of the engagement portion) of the threaded fastener 284 (e.g., the holding member) engages one of the circumferentially spaced recesses 290 of the wheel securing adapter 282 to prevent the rotational movement of the wheel securing adapter 282. Thus, in this embodiment, a portion of the threaded shaft 284a (e.g., a part of the engagement portion) of the threaded fastener 284 (e.g., the holding member) engages one of the recesses of the adapter to prevent the rotational movement of the adapter, and an engagement portion that engages the axial end face of the adapter to prevent the axial movement of the adapter. Since the outer circumferential surface 288 of the wheel securing adapter 282 does not engage the inner profile of the axle mounting bore 280, the wheel securing adapter 282 is freely rotatable within the enlarged section 280a (e.g., the adapter receiving bore) without moving axially with respect to the front fork 16, when the threaded fastener 284 (e.g., the holding member) is in the releasing position.

Fourth Embodiment

Figure 13:
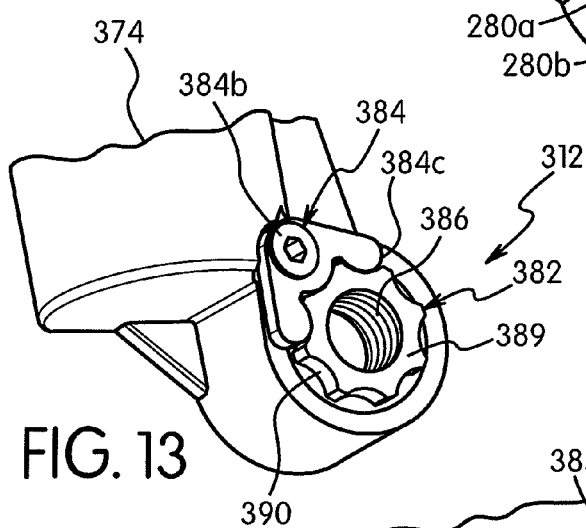
FIG. 13 is a perspective view of a of one end of the wheel securing structure in accordance with a fourth embodiment.
Figure 14:
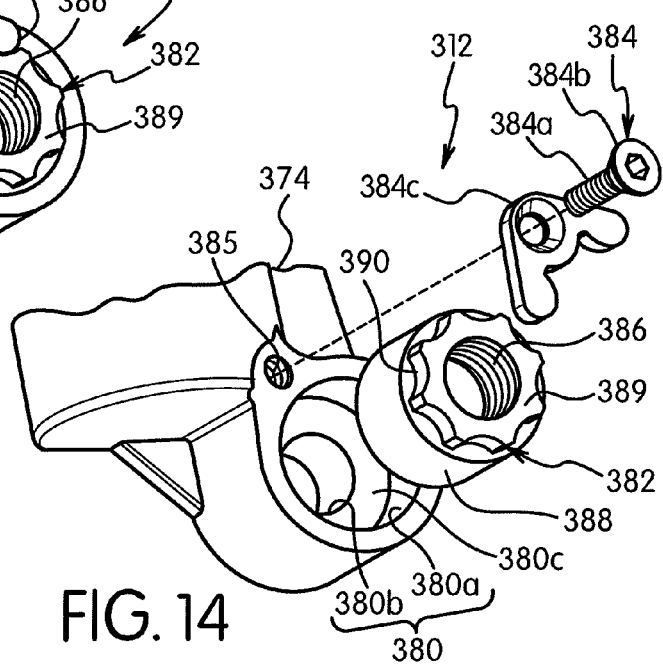
FIG. 14 is an exploded perspective view of the end of the wheel securing structure, illustrated in FIG. 13, in accordance with the fourth embodiment.

Referring now to FIGS. 13 and 14, a modified wheel securing structure 312 in accordance with a fourth embodiment will now be explained. The wheel securing structure 312 of this fourth embodiment basically includes a modified outer tube 374, a modified wheel securing adapter 382, and a modified threaded fastener 384. The wheel securing adapter 382 is a one-piece, unitary member that is formed of a hard rigid material. Preferably, the material of the wheel securing adapter 382 is harder than the material of the outer tube 374. The outer tube 374 is incorporated into the front fork 16 of the first embodiment by replacing the outer tube 74 of the first embodiment in the front fork 16 with the outer tube 374. Thus, the rest of the parts of the front fork 16 illustrated in the first embodiment are used with this embodiment.

The lower end of the outer tube 374 of the fork leg of the front fork 16 includes an axle mounting opening or bore 380. The axle mounting bore 380 receives the wheel securing adapter 382 for securing the skewer 44 of the hub 30 of the first embodiment thereto in the same manner as the first embodiment, but using the wheel securing adapter 382 instead of the wheel securing adapter 82. The axle mounting bore 380 has a step-shaped configuration with an enlarged section 380a and a reduced section 380b, each of which are unthreaded. The enlarged section 380a of the outer tube 374 (e.g., the axle support portion) constitutes an adapter receiving bore of the bicycle fork 16. An abutment surface 380c is formed between the sections 380a and 380b to limit axial movement of the wheel securing adapter 382 towards the other fork leg of the front fork 16.

The wheel securing adapter 382 is secured in the enlarged section 380a of the axle mounting bore 380 by the threaded fastener 384 in a releasable and reinstallable manner. The threaded fastener 384 constitutes a holding member. The threaded fastener 384 (e.g., the holding member) prevents both rotational movement of the wheel securing adapter 382 with respect to the bicycle fork 16 and axial movement of the wheel securing adapter 382 with respect to the bicycle fork 16 along an axis of the axle mounting bore 380 when the threaded fastener 384 (e.g., the holding member) is in a retaining position. The threaded fastener 384 (e.g., the holding member) is selectively movable between the retaining position and a releasing position by threading the threaded fastener 384 into or out of a threaded hole 385 in the outer tube 374 (e.g., the axle support portion). Thus, the threaded fastener 384 (e.g., the holding member) is operatively coupled between the wheel securing adapter 382 and the outer tube 374 (e.g., the axle support portion) to selectively hold the wheel securing adapter 382 in a predetermined orientations with respect to the outer tube 374 (e.g., the axle support portion).

In this embodiment, the threaded fastener 384 (e.g., the holding member) includes a bolt with a threaded shaft 384a and an enlarged head 384b. The threaded fastener 384 (e.g., the holding member) also includes a washer 384c positioned on the threaded shaft 384a of the bolt. The threaded shaft 384a of the bolt constitutes an attachment portion of the holding member. The washer 384c constitutes an engagement portion of the holding member.

The wheel securing adapter 382 includes a threaded axle mounting opening 386 and an outer circumferential surface 388 that is rotatably adjustable within the enlarged section 380a (e.g., the adapter receiving bore) of the outer tube 374 (e.g., the axle support portion). In this embodiment, the outer circumferential surface 388 of the wheel securing adapter 382 has a plurality of grooves or recesses 390. The threaded fastener 384 (e.g., the holding member) selectively engages the recesses 390 (i.e., three at a time) to selectively hold the wheel securing adapter 382 in one of a plurality of predetermined orientations based on which one of the recesses 390 is engaged with the threaded fastener 384 (e.g., the holding member). In particular, when the threaded fastener 384 is in the retaining position, the washer 384c (e.g., the engagement portion) of the threaded fastener 384 (e.g., the holding member) engages the axial end face of the wheel securing adapter 382 to prevent the axial movement of the wheel securing adapter 382 and engages a plurality of the circumferentially spaced recesses 390 of the axially projecting part 389 of the wheel securing adapter 382 to prevent the rotational movement of the wheel securing adapter 382.

Since the outer circumferential surface 388 of the wheel securing adapter 382 is cylindrical without any splines or threads along an entire axial length of the outer circumferential surface 388, the wheel securing adapter 382 is freely rotatable within the enlarged section 380a (e.g., the adapter receiving bore) without moving axially with respect to the front fork 16, when the threaded fastener 384 (e.g., the holding member) is in the releasing position.

Fifth Embodiment

Figure 15:
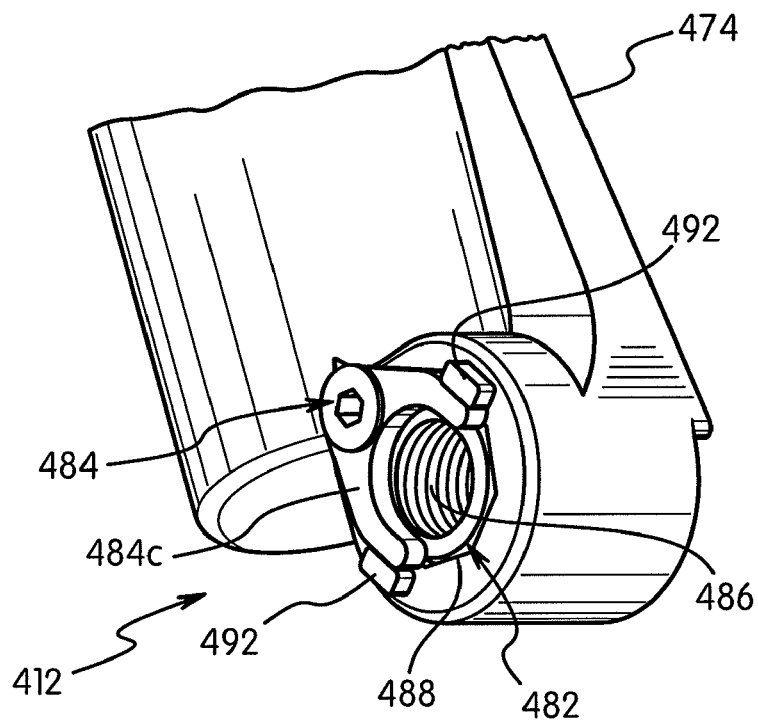
FIG. 15 is a front perspective view of a of one end of the wheel securing structure in accordance with a fifth embodiment.
Figure 16:
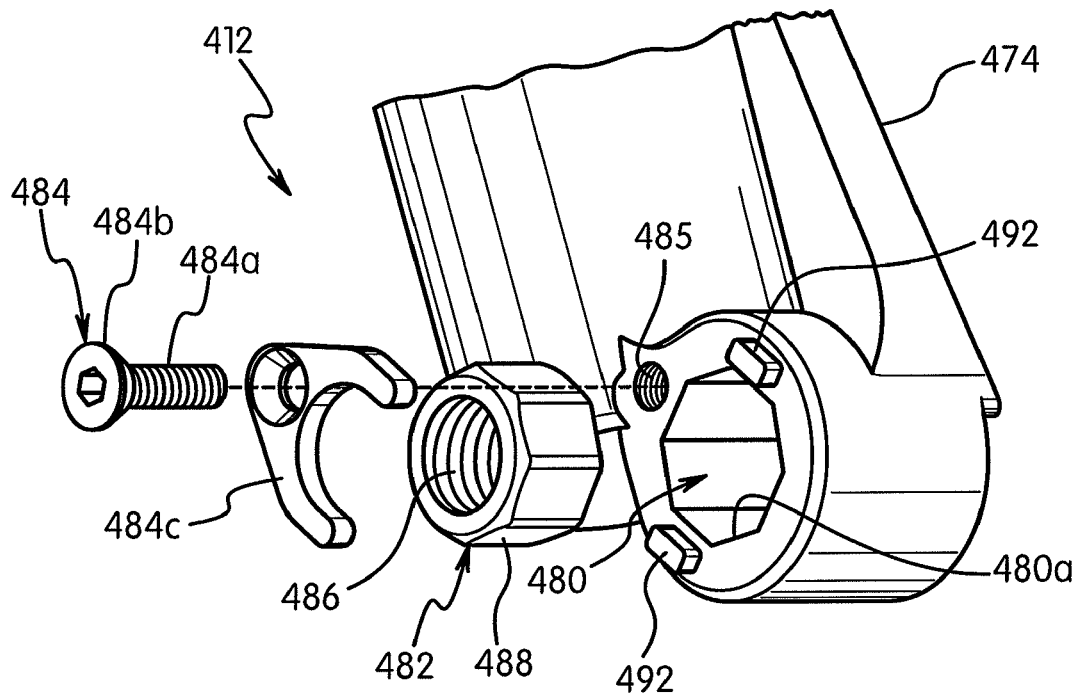
FIG. 16 is an exploded perspective view of the end of the wheel securing structure, illustrated in FIG. 15, in accordance with the fifth embodiment.

Referring now to FIGS. 15 and 16, a modified wheel securing structure 412 in accordance with a fifth embodiment will now be explained. The wheel securing structure 412 of this fifth embodiment basically includes a modified outer tube 474, a modified wheel securing adapter 482, and a modified threaded fastener 484. The wheel securing adapter 482 is a one-piece, unitary member that is formed of a hard rigid material. Preferably, the material of the wheel securing adapter 482 is harder than the material of the outer tube 474. The outer tube 474 is incorporated into the front fork 16 of the first embodiment by replacing the outer tube 74 of the first embodiment in the front fork 16 with the outer tube 474. Thus, the rest of the parts of the front fork 16 illustrated in the first embodiment are used with this embodiment.

The lower end of the outer tube 474 of the fork leg of the front fork 16 includes an axle mounting opening or bore 480. The axle mounting bore 480 receives the wheel securing adapter 482 for securing the skewer 44 of the hub 30 of the first embodiment thereto in the same manner as the first embodiment, but using the wheel securing adapter 482 instead of the wheel securing adapter 82. The axle mounting bore 480 has a step-shaped configuration with an enlarged section 480a and a reduced section (not shown), each of which are unthreaded. The enlarged section 480a of the outer tube 474 constitutes an adapter receiving bore of the bicycle fork 16.

The wheel securing adapter 482 is secured in the enlarged section 480a of the axle mounting bore 480 by the threaded fastener 484 in a releasable and reinstallable manner. The threaded fastener 484 prevents axial movement of the wheel securing adapter 482 with respect to the bicycle fork 16 along an axis of the axle mounting bore 480 when the threaded fastener 484 is in a retaining position. The threaded fastener 484 is selectively movable between the retaining position and a releasing position by threading the threaded fastener 484 into or out of a threaded hole 485 in the outer tube 474. Thus, the threaded fastener 484 is operatively coupled between the wheel securing adapter 482 and the outer tube 474 to selectively hold the wheel securing adapter 482 in a predetermined orientations with respect to the outer tube 474 (e.g., the axle support portion).

In this embodiment, the threaded fastener 484 includes a bolt with a threaded shaft 484a and an enlarged head 484b. The threaded fastener 484 also includes a washer 484c positioned on the threaded shaft 484a of the bolt.

The wheel securing adapter 482 includes a threaded axle mounting opening 486 and an outer circumferential surface 488 that is adjustable within the enlarged section 480a of the outer tube 474. In this embodiment, the outer circumferential surface 488 of the wheel securing adapter 482 has a plurality of flat surfaces for changing the orientation of the wheel securing adapter 482. The washer 484c of the threaded fastener 484 engages the axial end face of the wheel securing adapter 482 to prevent the axial movement of the wheel securing adapter 482. Two abutments 492 are provided on the lower end of the outer tube 474 to prevent the washer 484c of the threaded fastener 484 from rotating.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe a bicycle wheel securing structure should be interpreted relative to a bicycle equipped with a bicycle wheel securing structure as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:
1. A bicycle wheel securing structure comprising:
a bicycle fork having a pair of axle support portions that are spaced apart to receive a bicycle hub therebetween and with one of the axle support portions having an adapter receiving bore;
an adapter disposed in the adapter receiving bore in one of the axle support portions, with the adapter including a threaded axle mounting opening and an outer circumferential surface that is rotatably adjustable within the adapter receiving bore to one of a plurality of predetermined orientations; and
a holding member operatively coupled between the adapter and the one of the axle support portions with the adapter, the holding member being selectively movable between a retaining position and a releasing position,
the holding member preventing both rotational movement of the adapter with respect to the bicycle fork and axial movement of the adapter with respect to the bicycle fork along an axis of the axle mounting opening when the holding member is in the retaining position, the holding member having a center axis that extends radially with respect to the axis of the axle mounting opening, and the adapter being rotatable within the adapter receiving bore without moving axially with respect to the bicycle fork when the holding member is in the releasing position.

2. The bicycle wheel securing structure according to claim 1, wherein
the outer circumferential surface of the adapter includes a plurality of recesses with the holding member being engagable with the recesses to selectively hold the adapter in one of the predetermined orientations based on which one of the recesses is engaged with the holding member.

3. The bicycle wheel securing structure according to claim 1, wherein
the holding member includes a threaded fastener.

4. A bicycle wheel securing structure comprising:
a bicycle fork having a pair of axle support portions that are spaced apart to receive a bicycle hub therebetween and with one of the axle support portions having an adapter receiving bore;
an adapter disposed in the adapter receiving bore in one of the axle support portions, with the adapter including a threaded axle mounting opening and an outer circumferential surface that is rotatably adjustable within the adapter receiving bore to one of a plurality of predetermined orientations; and
a holding member operatively coupled between the adapter and the one of the axle support portions with the adapter, the holding member being selectively movable between a retaining position and a releasing position,
the holding member preventing both rotational movement of the adapter with respect to the bicycle fork and axial movement of the adapter with respect to the bicycle fork along an axis of the axle mounting opening when the holding member is in the retaining position, the holding member including a threaded fastener, the threaded fastener having a center axis that extends radially with respect to the axis of the axle mounting opening, and
the adapter being rotatable within the adapter receiving bore without moving axially with respect to the bicycle fork when the holding member is in the releasing position.

5. The bicycle wheel securing structure according to claim 4, wherein
the adapter includes a plurality of recesses with the threaded fastener being engagable with the recesses to selectively hold the adapter in one of the predetermined orientations based on which one of the recesses is engaged with the threaded fastener.

6. The bicycle wheel securing structure according to claim 1, wherein
the outer circumferential surface of the adapter is non-threaded along an entire axial length of the outer circumferential surface.

* * * * *